United States Patent [19]

Tsukamoto et al.

[11] Patent Number: 5,006,189

[45] Date of Patent: Apr. 9, 1991

[54] COATING METHOD AND CLEANING METHOD FOR HEAT-SOLUBLE MATERIAL

[75] Inventors: Masahide Tsukamoto, Nara; Yutaka Nishimura; Yasuo Fukui, both of Kadoma, all of Japan

[73] Assignee: Matsushita Electric Industrial Co., Ltd., Osaka, Japan

[21] Appl. No.: 357,597

[22] Filed: May 26, 1989

[30] Foreign Application Priority Data

May 26, 1988 [JP] Japan ................................ 63-128946
May 31, 1988 [JP] Japan ................................ 63-133262

[51] Int. Cl.[5] ................................ B32B 31/16

[52] U.S. Cl. ................................ 156/247; 156/281; 156/344; 156/389; 156/390; 156/584

[58] Field of Search .................... 101/33, 34; 156/238, 156/247, 281, 344, 389, 390, 584

[56] References Cited

U.S. PATENT DOCUMENTS 4,744,851 5/1988 Lorenz ............................ 156/247 X
4,746,389 5/1988 DiGenova .......................... 156/247

OTHER PUBLICATIONS

International Symposium Digest of Technical Papers, pp. 143 to 145 (1985).
Oki Electric Co., Research and Development Journal pp. 52 to 57, 126, vol. 52, No. 2.

*Primary Examiner*—Robert A. Dawson
*Attorney, Agent, or Firm*—Wenderoth, Lind & Ponack

[57] ABSTRACT

Coating of heat-soluble material on a substrate or cleaning is performed by supplying a heat-soluble material in heated and melted condition onto a substrate, laying a sheet member on the heat-soluble material, cooling the heat-soluble material to solidify, and peeling off the sheet member.

9 Claims, 4 Drawing Sheets

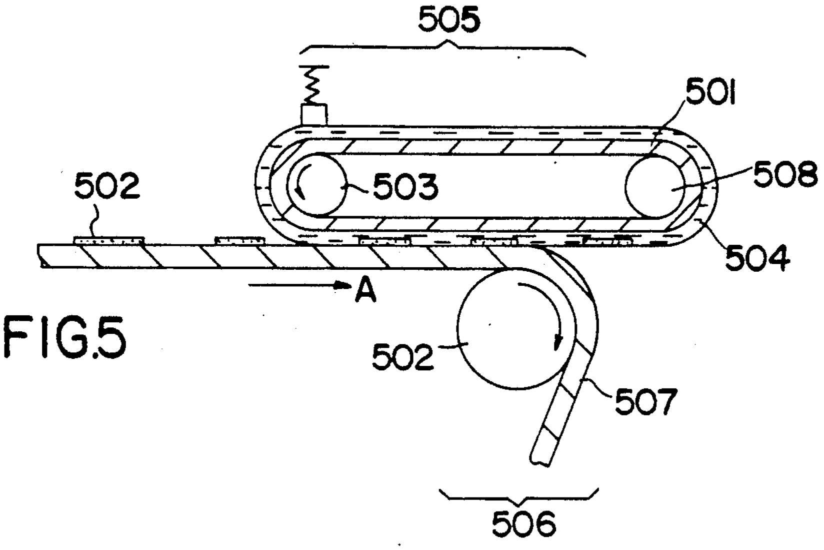
FIG.5
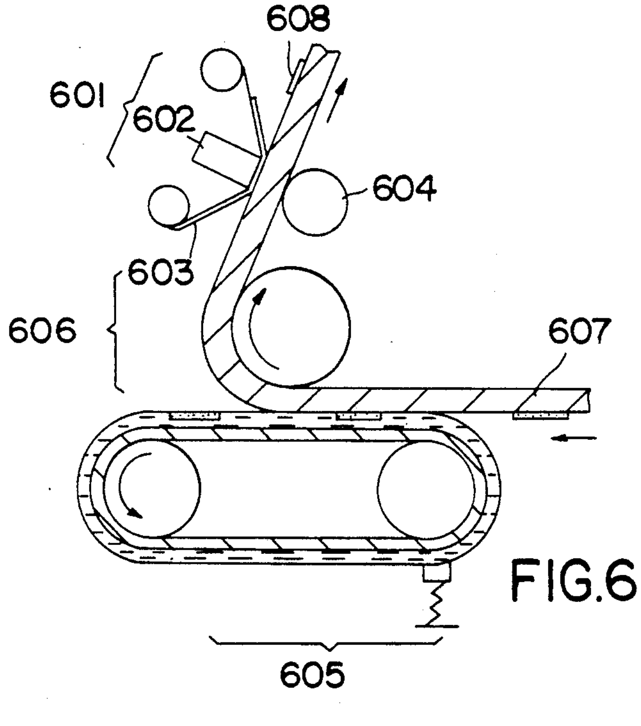
FIG.6
FIG.7
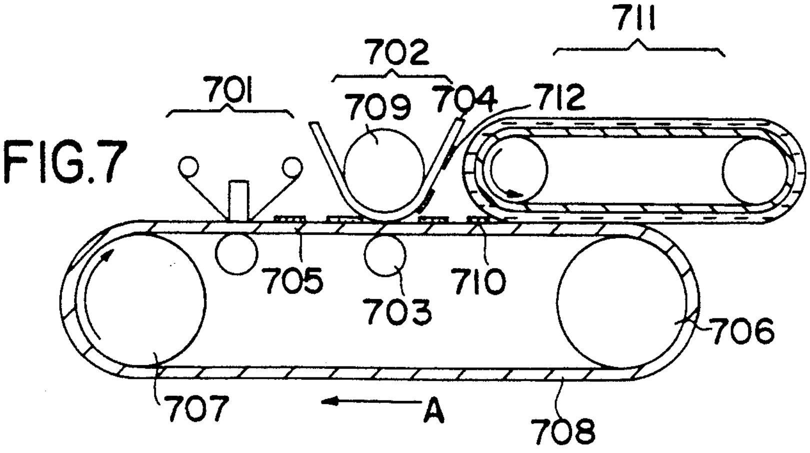

COATING METHOD AND CLEANING METHOD FOR HEAT-SOLUBLE MATERIAL

BACKGROUND OF THE INVENTION

1. Field of the Invention

The present invention relates to a coating method for producing a coating of a heat-soluble material, and a coating apparatus to achieve this and a method of cleaning the coating of the heat-soluble material. Further a printer, printed matter, and a display apparatus made by utilizing them.

2. Description of the Prior Art

At present, as a personal and handy printer, a thermal transfer printer is typically employed. This printer has various defects, however, such as a slow recording speed and high operational cost, i.e., a high unit price per sheet. In a thermal printer using a line head (i.e., a thermal head made by arranging the heating elements to correspond with the full width of a sheet of paper), there is required a sheet of thermal ink-transfer ribbon [a ribbon made of PET (polyethylene terephthalate) having a thickness of $3\sim6\mu$ coated with heat-soluble ink in $3\sim5\mu$] per sheet of A4 size print. Accordingly, the printing cost is very high. On the other hand, in the serial type printer, the ribbon is used only for the portions to be printed, so that the consumption of ribbon is relatively small. In reality, however, in the latter system, the ribbon is required to be housed in a cassette so as to facilitate the ribbon handling, and it costs higher than the line head type printer.

In order to solve the above problems, studies were made on the method of regenerating the ribbon of a heat-soluble material in the printer. (cf. Isamu Nose, et al., "A Color Transfer Printer with Recoating Mechanism" International Symposium Digest of Technical Papers, pp 143-145 (1985)).

However, for the reasons that no uniform coating is obtainable and because the heat-soluble material is deteriorated, the above studies have been unfruitful.

SUMMARY OF THE INVENTION

An object of the present invention is to provide a method of preparing a uniform coating of a heat-soluble material i.e., a material which can be melted by heat and the melt coated on a substrate. Another object of the invention is to provide a printer utilizing this method.

In order to attain these objects, the coating method of the present invention comprises the steps of supplying a heat-soluble material melted under heating, onto a substrate laying a sheet member on the heat-soluble material, cooling the heat-soluble material to solidify it, and peeling off the sheet member, whereby a coating of a heat-soluble material is formed on the substrate.

With the above method, a coating of heat-soluble material (e.g., thermal transfer coating) can be easily produced. Further, as it is possible to regenerate the thermal ink-transfer ribbon (a thin polyethylene terephthalate sheet to which a heat-soluble ink is applied) in an apparatus, a printer having a low operational cost can be obtained.

A further object of the present invention is to provide a method of cleaning printed matter soiled with a heat-soluble material.

A still further object of the invention is to obtain, by utilizing the above method, an erasable paper and a printer.

In the cleaning method, the conditions of the sheet member and the substrate, including the peeling conditions, are appropriately selected such that the heat-soluble material does not remain at all on the substrate, and the heat-soluble material is completely transferred to the sheet member. Namely, the substrate can be cleaned. By utilizing this method, letters and images formed on a plastic sheet by thermal transfer can be erased, so that it is possible to obtain an erasable paper and an apparatus for the designed object.

A further object of the present invention is to obtain a display apparatus using the above coating method and cleaning method utilizing thermal transfer.

BRIEF DESCRIPTION OF THE DRAWINGS

FIG. 5 is a construction view of a cleaning apparatus according to the present invention;

FIG. 6 is a construction view of a display apparatus according to the present invention; and FIG. 7 is a construction view of a printer according to the present invention.

DESCRIPTION OF THE PREFERRED EMBODIMENTS

Figure 1A:
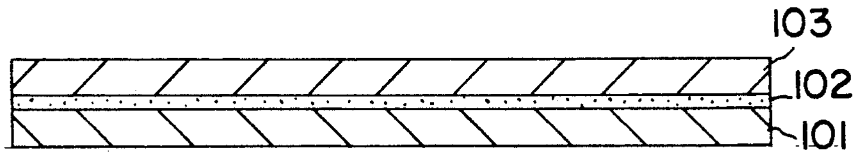
FIGS. 1 (*a*), (*b*) are illustrative views of a coating method according to the present invention.
Figure 1B:
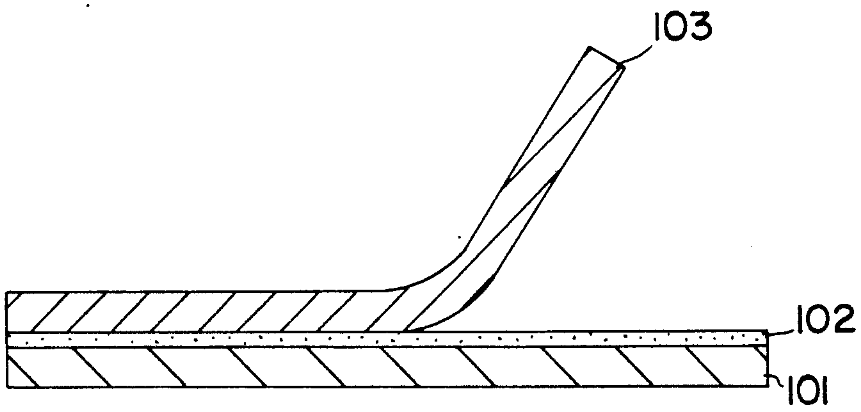

Hereinafter, the coating method and apparatus, cleaning method and apparatus, etc. of the present invention will be described with reference to the accompanying drawings. FIGS. 1 (*a*), (*b*) are illustrative views of a coating method according to the present invention. In FIG. 1(*a*), the part 101 is a substrate or support member.

The substrate 101 may be composed of a generally available material which does not permit liquids to permeate such as plastics, rubber, metal, paper having no liquid permeability, ceramics, or the like. Onto this substrate a heat-soluble material 102, which has been heated to melt as in FIG. 1(*a*), is supplied, and on this molten heat-soluble material a sheet member 103 is laid. As a heat-soluble material for the purpose of regenerating the thermal ink-transfer ribbon, which is an object of the present invention, a material comprising, as the main components, wax and color pigments can be used. Other heat-soluble resins (e.g., epoxy resins, acryl resins, etc.) and their mixtures with color pigments or dyes may also be used. With respect to the sheet member 103, almost all flexible liquid nonpermeable sheet-form materials are usable. The preferred material is a plastic sheet. From the points of cost and strength, a sheet of polyethylene terephthalate is most preferred.

Next, the product is cooled as in FIG. 1(*b*) (this may be forced cooling or natural cooling), and after the heat-soluble material is solidified, the sheet member 103 is peeled off. At this time, the heat-soluble material 102 remains on the substrate 101 to become a coat.

Whether the heat-soluble material attaches to the sheet member or to the substrate depends on the adhesion of each material at the contact surface, the cohesion of the heat-soluble material, and whether the solidified material is to be removed by bending the substrate or by bending the sheet member. Assuming that the sheet member and the substrate are made of the same materials and with the same surface conditions, and where the cohesion of the heat-soluble material is larger than the adhesion (when the heat-soluble material is in a solid state), the heat-soluble material is separated from the bent side and remains on the flat side. Such relationships are well known in the field of the adhesion. If the cohesion of the heat-soluble material is smaller than the adhesion (when the heat-soluble material is in liquid state), the heat-soluble material is separated into two parts to attach to both the sheet member and the substrate. In the present invention, the reason why peeling is made after cooling is to employ the full force of cohesion of the heat-soluble material to transfer the heat-soluble material to the substrate. It is possible to adjust the relation of adhesion between the parts so that the heat-soluble material attaches to the substrate side. However, if, for example, the adhesion between the substrate and the heat-soluble material is strengthened so that a coating of heat-soluble material is unexceptionally formed on the substrate, adhesion of the heat-soluble material to the substrate tends to be too strong, leading frequently to undesirale results in performing thermal transfer.

What is interesting in the present invention is that the heat-soluble material does not remain on the sheet member side. This is because the heat-soluble material is removed in the solid state in which it has large cohesion, which is a feature of the present invention. From this, it is known that when the relationship between the substrate and the sheet member is reversed, the substrate can be cleaned. This procedure will be explained in detail later.

Figure 2:
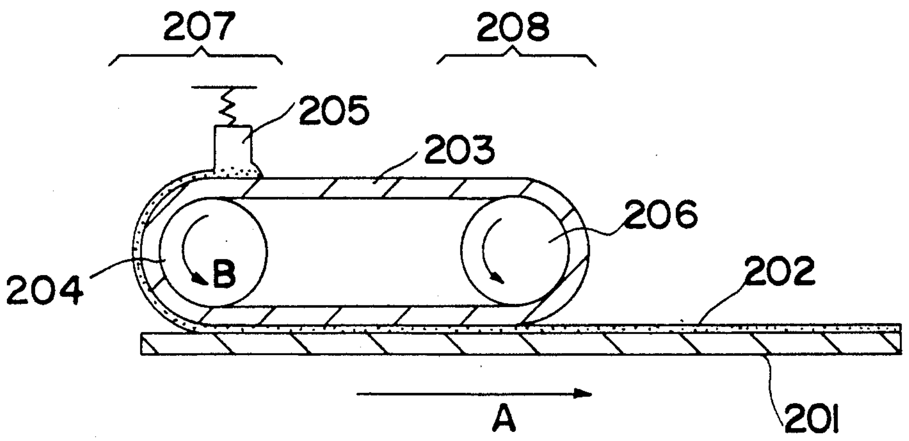
FIG. 2 is a construction view of a coating apparatus according to the present invention.

FIG. 2 is an illustrative view of a coating apparatus of the present invention. A substrate 201 moves in the direction of arrow mark A to come into contact with a heat-soluble material feeder 207. The heat-soluble material feeder 207 comprises a heat roller 204, a sheet material 203 (in the illustrated case, an endless belt) and a block of heat-soluble material 205. The block of heat-soluble material 205 is melted by the heat of the heat roller 204 and laid on the substrate 201. Under this condition, the product is moved in the direction of arrow mark A, and when cooled, the sheet member 203 is peeled off from the substrate by a removing unit 208 comprising a roller 206. At this time, a coating 202 of heat-solule material remains on the substrate 201.

Figure 3:
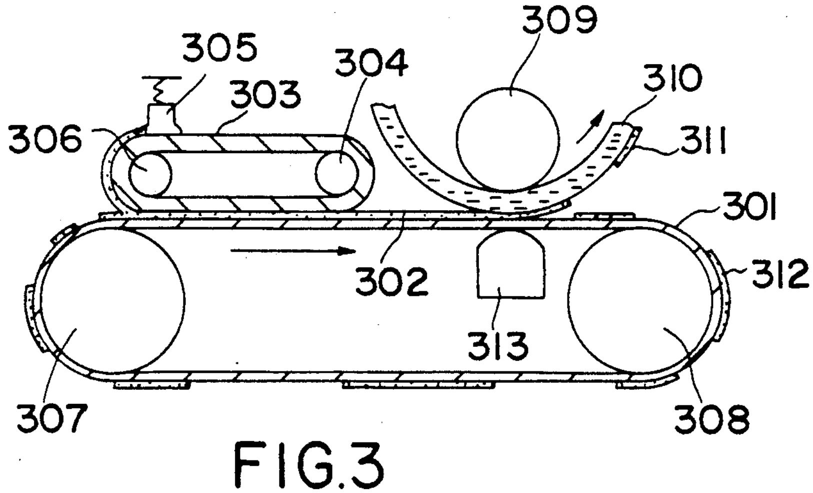
FIG. 3 is a construction view of a printing apparatus according to the present invention.

FIG. 3 is a construction view of a printer comprising the above coating apparatus additionally incorporated with a transfer unit (write-in unit). The printer includes a heat-soluble material supply unit comprising a heat roller 306, a sheet member 303, a heat-soluble material 305 and a peeling unit comprising a roller 304, with which a coating 302 of a heat-soluble material is formed on a substrate 301 of an endless belt wound on belt rollers 307, 308. By the transfer unit (write-in unit) (e.g., thermal head), a coating of this heat-soluble material is transferred on a material to be transferred 310. The part 311 is a coating of the transferred heat-soluble material, and 309 a platen.

The part 312 is a coating of a heat-soluble material remaining on the substrate side without being transferred. The coating of heat-soluble material thus remaining in a negative form again becomes a uniform film of a heat-soluble material by the coating unit (comprising a heat-soluble material supply unit and the peeling unit).

In the above description of the apparatuses, each part has been concretely shown, but the apparatuses of the present invention are not to be limited to these parts. Various methods of realizing the object of each part will be readily apparent to those skilled in the art of printing. Further, for controlling the thickness of the heat-soluble material coating, a coating thickness sensor may be provided, with which the heat-soluble material supply unit may be adjusted to control the coating thickness control and the like. With respect to the transfer unit (write-in unit), it is also possible to include the formation of image signals of an image scanner and the like. When such element is incorporated, the printer may have the functions of a copying machine.

EXAMPLE 1

On a PET film (polyethylene terephthalate) of about 100$\mu$ as a substrate, a black heat-soluble material wax mixture [carbon powder (0.5 part by weight), carnauba wax (3.5 parts by weight), paraffin wax (3.5 parts by weight), melting point about 70°~75° C.] was placed, which was heated to melt on a hot plate at about 100° C. A sheet member (PET sheet of 25$\mu$) was laid thereon, which was drawn with a rubber roller to spread thinly the wax mixture and foams were removed. Under that condition the product was cooled to room temperature (about 25° C.) to remove the sheet member as in FIG. 1(*b*) in the state where the heat-soluble material was solid. A shaded coating of heat-soluble material remained on the substrate. On measurement, the coating thicknesses were about 1$\mu$ at the thin portion and about 3$\mu$ at the thick portion.

EXAMPLE 2

The operation to lay the sheet member on a hot plate in Example 1 was carried out with a fixer (for a copying machine FP-1000 made by Matsushita Electric Industrial Co., Ltd.) at about 100° C., followed by peeling off as shown in FIG. 1(*b*) to give a uniform coating of 5–8$\mu$.

EXAMPLE 3

When, in Example 1, a commercialized sheet already coated with an adhesive for a laminate (a TORAMI-FILM made by Tokyo Laminex) was used as a sheet member, there was obtained a uniform coating of a heat-soluble material of 5–10$\mu$.

EXAMPLE 4

Using a PET of 9$\mu$, by the procedure of Example 3, a coating of heat-soluble material was prepared. The coating surface of the heat-soluble material was laid on a sheet of paper, and the laminate was inserted in the printer of a word processor (FW-20 made by Matsushita Electric Industrial Co., Ltd.). Excellent results were obtained.

Now, the cleaning method, cleaning apparatus, display method, display apparatus, printing method and printer, which are the other objects of the present invention, will be described with reference to the drawings.

Figure 4A:
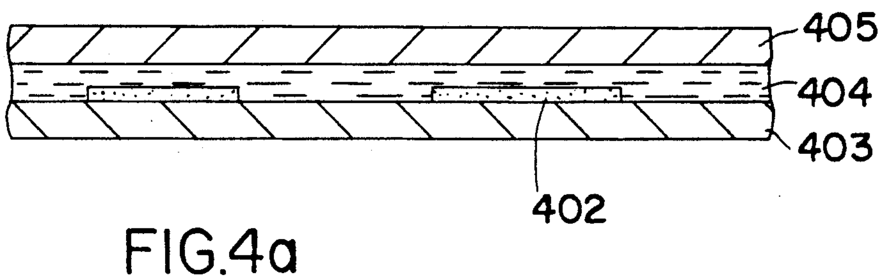
FIGS. 4(*a*), (*b*) are illustrative views of a cleaning method according to the present invetion.
Figure 4B:
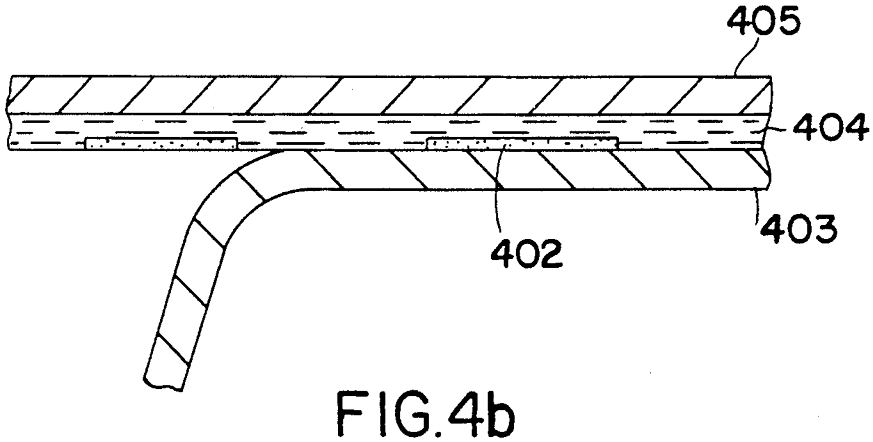

FIGS. 4(*a*) and (*b*) are views to illustrate the cleaning method of the present invention. In FIG. 4(*a*), the materials of an image-carrying substrate 403 include plastics, metal, liquid non-permeable paper, ceramics, etc. The image-carring substrate 403 is to carry an image-forming material 402 thereon.

As the image-forming material presently used for office automation, there are the toner for electrophotography, the wax ink for thermal transfer, etc.

Onto this image-carrying substrate, a heat-soluble material 404 is supplied as in FIG. 4(*a*), and a cleaning sheet member 405 is laid on the molten heat-soluble material. Then, the resulting product is cooled and the image-carrying substrate 403 is peeled off from the cleaning sheet member as in FIG. 4(*b*). At this time, the image-forming material 402 is moved to the cleaning sheet member together with the heat-soluble material 404 as in the drawing, and the image-carrying substrate is cleaned. The heat-soluble material includes, for example, wax, resins, or their mixture. In FIG. 4(*a*) and FIG. 4 (*b*), a border line is drawn between the image-forming material and the heat-soluble material. However, if the image-forming material is the same as the heat-soluble material or has a similar composition the two materials are cosolubilized such as to to dissolve the border line.

Practically, it is more economical for the image-forming material and the heat-soluble material to be the same, because the recovered heat-soluble material can be re-utilized. The cleaning sheet member includes many usable materials such as, for example, metal, resins, etc. Whether the image-forming material and the heat-soluble material attach to the cleaning sheet member or to the image-carring substrate depends on the adhesive force at the contact surface of each material, cohesion of the image-forming material and heat-soluble material, and further, whether to perform peeling off by curving the image-carring substrate or by curving the cleaning sheet member. Assuming that the cleaning sheet member and the image-carrying substrate are of the same materials and have the same surface conditions, and in the case wherein the cohesion of the image-forming material and the heat-soluble material is larger than the adhesive force (where the image-forming material and the heat-soluble material are in solid state), the image-forming material and the heat-soluble material are separated from the curved side and remain on the flat side. If the cohesion of either the image-forming material or the heat-soluble material is smaller than the adhesive force (where any or either one of them is in liquid state), the image-forming material or the heat-soluble material is separated into two parts and attaches to both the cleaning sheet member and the image-carrying substrate.

In the present invention, the sequence of cooling and then removing is for the purpose of obtaining an increased cleaning effect by increasing the cohesion of the image-forming material and heat-soluble material.

Even by practicing peeling off with the cleaning sheet member side curved, it is possible to adjust the relationship of the adhesion of each part so that the image-forming material and the heat-soluble material attach to the cleaning sheet member side. However, if it is so practiced, the fixation force of the image-forming material to the image-carrying substrate is weakened (image fixation becomes poor) and undesirable results may occur.

FIG. 5 is a construction view of a cleaning apparatus of the present invention. An image-carrying substrate 507 carrying an image-forming material 502 moves in the direction of the arrow mark A to come into contact with a heat-soluble material supply unit 505. The heat-soluble material supply unit comprises a heat roller 503, a roller 508, a cleaning sheet member 501 (in the illustrated case, an endless belt) and a heat-soluble material 504. The heat-soluble material 504 is cleaned and removed, and thereafter supplied again. In the drawing, the part to be cleaned and removed is not illustrated, but in practice it is provided.

The heat-soluble material 504 is melted by the heat-roller 503 and laid on the image-carrying substrate 507. Under this condition, the resulting product moves in the direction of arrow mark A, and after cooling, the substrate is peeled off by a peeling unit 506 comrising a roller 502. At this time, the image-forming material attaches to and is carried by the heat-soluble material which has been solidified or elevated in cohesion. In this way, the image-forming material on the image-carrying substrate can be readily cleaned. Therefore, if an image is formed by placing a heat-soluble material on the cleaned image-carrying substrate again by heat transfer or the like, a display method as described hereinafter can be obtained.

FIG. 6 is a construction view of a display apparatus for displaying information and data by carrying out writing and cleaning. An image-carrying substrate 607 is brought into contact with a heat-soluble material supply unit 605 similar to that shown in FIG. 5, cleaned by a peeling unit 606, and on it again new information and data are written in (image-forming material is laid) with a transfer unit (write-in unit) 601. The transfer unit 601 comprises a thermal head 602, a thermal ink-transfer ribbon 603 and a platen 604. The part 608 is a newly laid image-forming material.

The thermal ink-transfer ribbon 603 may be made by using the aforementioned coating method (coating method as shown in FIG. 2). In this case, the running cost is reduced.

The image-carrying substrate may be endless or in a cut sheet form. In the case of a cut sheet, it can be utilized as an erasable paper. In case of producing the erasable paper, use of plastic material, especially a polyethylene terephthalate sheet, is preferred from the point of economy strength, etc. Further, when a releasing layer of silicon resin or the like, which has good releasing properties, is formed on the surface of such sheet, removal of the image forming material is assured, and clean surface condition is easily maintained for a long duration. In the case of providing a releasing layer, it is preferred to effect markings on either the surface or the reverse side by printing or the like so as to show in which side the releasing layer lies.

There may be adopted a printing method which comprises repeating the steps of placing an image-forming material on an image-carrying substrate, transferring the image-forming material to a material to be printed, and cleaning the image-forming material (non-transferred) which remain. The superior point of this printing method to that of the ordinary printing method of the thermal transfer system is that a beautiful printing can be made on rough paper, if an elastic image-forming material substrate (blanket) is used.

FIG. 7 is a construction view of a printer. An endless image-carrying substrate 708 (blanket) is run in the direction of arrow mark A in the drawing with a roller 707 and a peeling roller 706. By means of a first transfer unit (write-in unit) 701, an image 705 by the image-forming material is made, which is transferred to a material to be printed 704 by a second transfer unit 702.

The part 712 is a transferred image. The second transfer unit 702 comprises a pressure roller 703 and a heat roller 709. The remaining (non-transferred) image-forming material 710 is cleaned by a heat-soluble material supply unit 711 and a peeling roller 706.

In the foregoing description of the apparatus, the respective parts have been concretely shown, but the present invention is not to be limited thereto. Various other methods of realizing the objects of the respective parts will be apparent to those skilled in the printing art.

With respect to the transfer unit (write-in unit), it is possible to include formation of the image signal such as with an image scanner. In such a case, the printer may have the function of copying machine.

EXAMPLE 5

On an image-carrying substrate of a PET (polyethylene terephthalate) film having a thickness of about 100μ, letters of wax ink [image-forming material (melting point, about 70° C.)] were written, using a thermal transfer printer (word processor FW-20 used in Example 4). A black heat-soluble material wax mixture (carbon powder 0.5 part by weight, carnabau wax 3.5 parts by weight, paraffin wax 3.5 parts by weight; melting point about 70°~75° C.) was placed thereon, and melted under heating on a hot plate of about 100° C. On the resulting product, a cleaning sheet member (25μ PET sheet) was placed, which was squeezed from above with a rubber roller to extend the wax mixture into thin form to remove foams. Under this condition, the resulting product was cooled to room temperature (about 25° C.), and, in a condition where the image-forming material and the heat-soluble material were in a solid state, both the image-forming substrate and the heat-soluble material were removed from the substrate.

EXAMPLE 6

In Example 5, instead of making the image on the image-carrying substrate by thermal transfer, the image was made by copying a magazine with a copying machine (FP-2520 made by Matsushita Electric Industrial Co., Ltd.). That is to say, an OHP was made. When the subsequent process was performed in entirely the same manner as in Example 5, the image-carrying substrate could be satisfactorily cleaned.

EXAMPLE 7

In Example 5, a commercialized sheet coated with an adhesive for laminate (article name: TORAMI-FILM made by Tokyo Laminex) was used as the cleaning sheet member and the heat-soluble material, by which good cleaning could be performed as in Example 5.

EXAMPLE 8

Using a 25μ PET, the operation was made in the same manner as in Example 5 to obtain an image-carrying substrate by thermal transfer. The resulting image on the image-forming material (heat-soluble ink) side was laid on paper (smoothness, 40 seconds) and passed through a space between the heat roller (metal) at about 105° C. and the pressure roller (silicon rubber). Although a blur was formed, clear printing could be obtained. At that time, the image-forming material partly remained on the image-carrying substrate, without being fully transferred. On the resulting product, a commercialized thermal ink-transfer ribbon (made by Fuji Kagakushi Kabushiki Kaisha; melting point of ink about 70° C.) was laid as a cleaning sheet member and the layer was heated and squeezed with a roller to expel foams. The resulting product was cooled. With the thermal ink-transfer ribbon side kept flat and the image-carrying substrate curved, peeling was performed, by which the image-carrying substrate was cleaned.

What is claimed is:

1. A cleaning method for removing an image-forming material formed on a surface of an image-carrying substrate from said surface of said image-carrying substrate, comprising the steps of:

supplying a heat-soluble material in a heated and melted condition onto said surface of said image-carrying substrate on which said image-forming material has been formed;

laying a cleaning sheet member on said heat-soluble material supplied onto said surface of said image-carrying substrate;

cooling said heat-soluble material to solidify said heat-soluble material; and separating said image-carrying substrate and said cleaning sheet member from each other such that said image-forming material is moved from said surface of said image-carrying substrate to said cleaning sheet member together with the solidified heat-soluble material.

2. A cleaning method according to claim 1, wherein said heat-soluble material is the same material as said image-forming material.

3. A cleaning apparatus for removing an image-forming material formed on a surface of an image-carrying substrate from said surface of said image-carrying substrate, comprising:

means for supplying a heat-soluble material in a heated and melted condition onto said surface of said image-carrying substrate on which said image-forming material has been formed;

means for laying a cleaning sheet member on said heat-soluble material supplied onto said surface and said image-carrying substrate; and means for separating said image-carrying substrate and said cleaning sheet member from each other, after said heat-soluble material has cooled and solidified, such that said image-forming material is moved from said surface of said image-carrying substrate to said cleaning sheet member together with the solidified heat-soluble material.

4. A cleaning apparatus according to claim 3, wherein said heat-soluble material is the same material as said image-forming material.

5. A printing apparatus comprising:

erasing means for erasing an image-forming material formed on a surface of an image-carrying sheet to obtain an erased image-carrying sheet; and means for forming a new image-forming material on said surface of said erased image-carrying sheet according to an image data, wherein said erasing means comprises:

means for supplying a heat-soluble material in heated and melted condition onto said surface of said image-carrying sheet on which said image-forming material has been formed;

means for laying a cleaning sheet member on said heat-soluble material supplied onto said surface of said image-carrying sheet; and means for separating said image carrying sheet and said cleaning sheet member from each other, after said heat-soluble material has cooled and solidified, such that said image-forming material is moved from said surface of said image-carrying sheet to said cleaning sheet member together with the solidified heat-soluble material.

6. A printing apparatus according to claim 5, wherein said cleaning sheet member is in the form of an endless belt.

7. A printing apparatus comprising:

means for forming an image-forming material on a surface of an image-carrying member according to an image data;

means for transferring said image-forming material formed on said surface of said image-carrying member to a member to be printed; and cleaning means for removing said image-forming material remained untransferred on said surface of said image-carrying member, said cleaning means comprising:

means for supplying a heat-soluble material in a heated and melted condition onto said surface of said image-carrying member;

means for laying a cleaning sheet member on said heat-soluble material supplied onto said surface and said image-carrying member; and means for separating said image-carrying member and said cleaning sheet member from each other, after said heat-soluble material has cooled and solidified, such that said image-forming material is moved from said surface of said image-carrying member to said cleaning sheet member together with the solidified heat-soluble material.

8. A printing apparatus according to claim 7, wherein said cleaning sheet member is in the form of an endless belt.

9. A printing apparatus according to claim 7, wherein said image-carrying member is in the form of an endless belt.

* * * * *